UNITED STATES PATENT OFFICE.

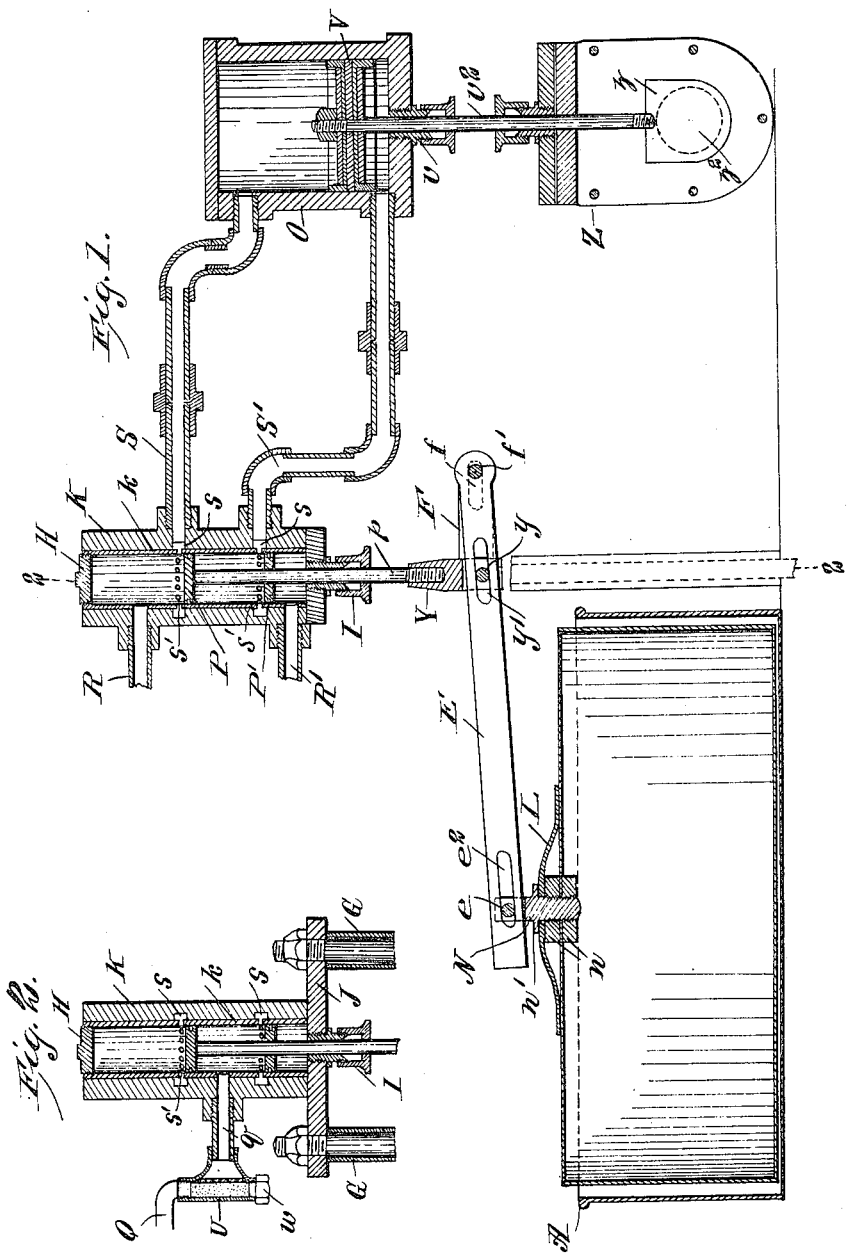

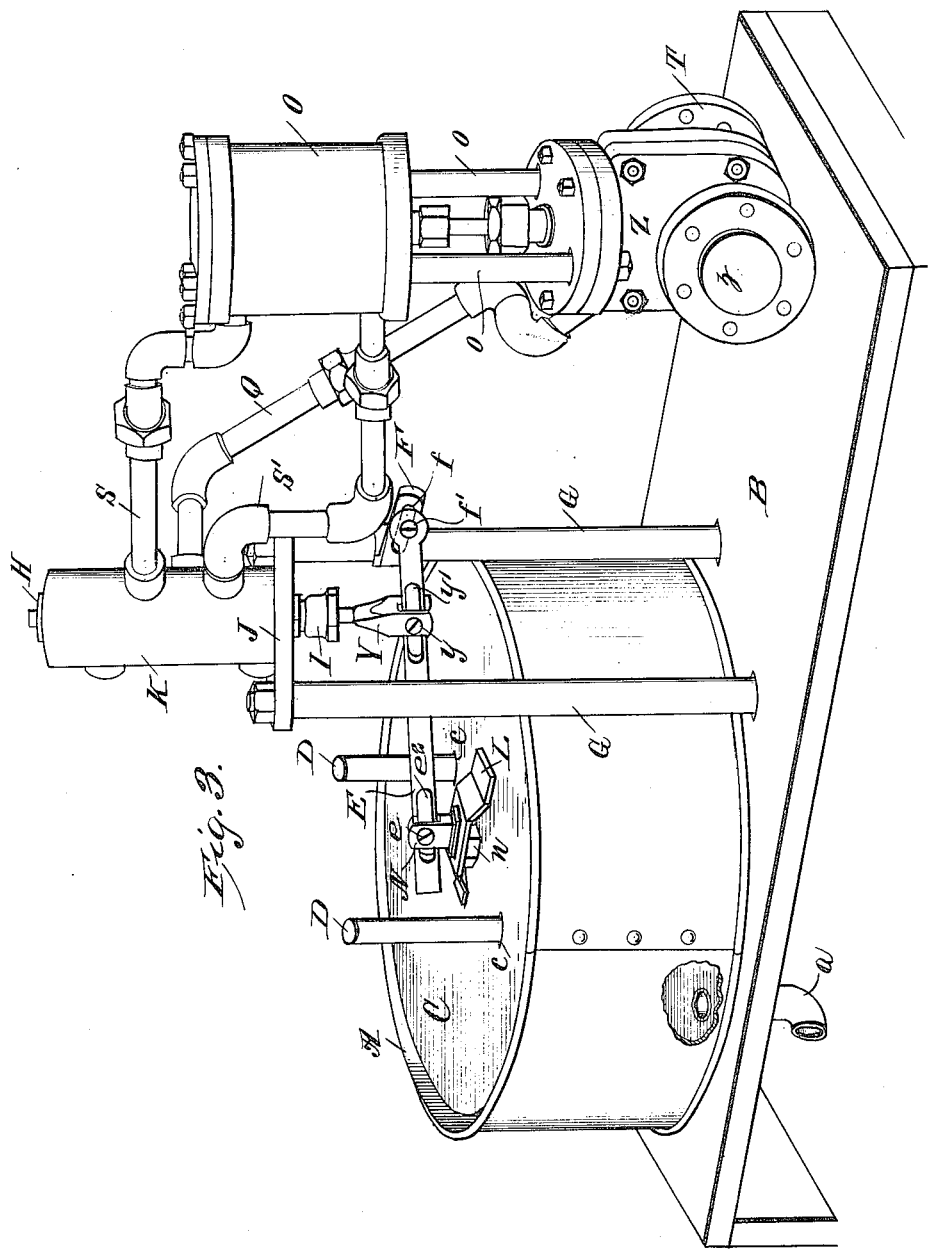

WILLIAM L. BRUBAKER, OF HARRISBURG, PENNSYLVANIA.

AUTOMATIC REGULATING DEVICE FOR WATER-TANKS.

949,616.  Specification of Letters Patent.  Patented Feb. 15, 1910.

Application filed June 16, 1909. Serial No. 502,477.

*To all whom it may concern:*

Be it known that I, WILLIAM L. BRUBAKER, a citizen of the United States, and a resident of Harrisburg, in the county of Dauphin and State of Pennsylvania, have invented certain new and useful Improvements in Automatic Regulating Devices for Water-Tanks, of which the following is a specification.

My invention relates to improvements in means for automatically regulating the amount of water in tanks or other containers.

The device is particularly applicable for keeping filled the tanks or troughs disposed in the center of a railway track for the purpose of supplying water to a passing engine, and it consists in the combination, constructions and arrangements of parts herein described and claimed.

An object of my invention is to provide a device which is actuated by a float but in which the valve mechanism is operated directly by the water pressure from the water main.

A further object of my invention is to provide means whereby the force of the water from the main pipe may be shifted first from one side and then to the other of a piston which is connected with the valve that regulates the admission of the water.

A further object of my invention is to provide means for adjusting the float relative to the other parts so as to render the device capable of operating with the water at different heights in the tank.

Further objects and advantages will appear in the following specification and the novel features of the device will be particularly pointed out in the appended claims.

My invention is illustrated in the accompanying drawings in which similar reference characters indicate like parts in the several views, and in which:

Figure 1 is a central section through the float and controlling valves; Fig. 2 is a section of the auxiliary cylinder on the line 2—2 of Fig. 1, and Fig. 3 is a perspective view of the device.

In carrying out my invention, I provide a casing A which is situated at a point convenient to the trough or tank and which communicates therewith by means of a pipe $a$, the bottom of the casing being approximately on the level with the bottom of the trough so as to permit the level of the water in the casing to rise and fall with the level of the water in the trough. In Fig. 3 I have shown the casing as mounted on a base B, but it is obvious that it might be located on any form of base suitable for the purpose.

Within the casing is a float C which consists preferably of a hollow metal cylinder which is made air tight and is provided with two cylindrical openings $c$, see Fig. 3, through which a pair of guide rods D extend. These rods are supported by the member B and are for the purpose of keeping the float from rotating.

Secured to the upper part of the float by means of the nuts $n$ is a slotted upright N having a flange $n^1$ arranged to engage the upper side of the spring nut lock L. The lever E is arranged to fit in the slot at the top of the upright N and is connected to the latter by means of a screw $e$ which passes through the slot in the lever E, the latter being for the purpose of adjustment. The opposite end of the lever is pivotally attached to an arm F secured to one of the upright supporting members G. The member F is also provided with a slot $f$ through which the screw $f^1$ extends.

The auxiliary cylinder whose piston is operated directly by the float is clearly shown in Figs. 1 and 2. It consists of an outer casing K having an interior lining $k$. The bottom of the auxiliary cylinder rests upon the cross member J which is supported at the top of the upright G. The top of the cylinder is closed by means of a plug H and the bottom, which is formed by the cross member J, is provided with a packing gland I. The auxiliary cylinder is provided with two pistons, an upper piston P, and a lower piston $P^1$, and the piston rod $p$ is connected by means of the yoke Y to the lever E by means of the screw $y$ which passes through the slot $y^1$ in the lever.

Communicating with the interior of the auxiliary cylinder are the exhaust pipes R and $R^1$, the former being at the top and the latter at the bottom, respectively. On the opposite side are the upper and lower pipes S and $S^1$; the former communicates with an annular channel $s$ in the cylinder casing K and this channel communicates in turn with the interior of the cylinder by means of the openings $s^1$. The pipe $S^1$ communicates with a similar annular channel $s$ having the openings $s^1$.

The intake pipe Q is shown in Fig. 3 as leading from the main supply pipe T at a point near the regulating valve. It will be understood that the supply pipe Q could be connected with the supply mains at any point or with a separate pipe leading directly from the water main. The pipe Q communicates with a header U, the latter containing a filter which is preferably a metal cylinder having perforations, the cylinder being filled with suitable material for filtering out foreign matter from the water. The header U in turn communicates with the interior of the auxiliary cylinder by a short pipe $q$.

Referring now to Fig. 1, it will be seen that I have provided a main cylinder O in which the piston V is located. The piston is provided with suitable packing so as to render it water tight and has a packing gland $v$ at its bottom through which the piston rod $v^2$ projects.

The casing Z for the regulating valve is disposed immediately beneath the cylinder O, the two being connected together by the rods $o$. The piston rod $v^2$ is connected directly to the valve gate $z$ which controls the opening $z^2$ of the main supply pipe which feeds the tank or trough.

From the foregoing description of the various parts of the device, the operation may be readily understood. We will assume that the tank has been filled and that the water has been taken up by a passing engine. The lowering of the level of the water in the tank or trough causes the corresponding lowering of the level of the water in the casing A. Thereupon the float descends and in its descent draws downwardly on the piston rod $p$ of the auxiliary cylinder, thereby causing the pistons P and P¹ to take the positions shown in Fig. 1. It will be observed that the pipe $q$ communicates with the interior of the auxiliary cylinder between the two pistons P and P¹ and in the position shown in Fig. 1 the water from the pipe $q$ will flow through the openings $s^1$ into the annular channel $s$ and then through the pipe S¹ into the bottom of the main cylinder O thereby forcing up the piston V which opens the valve gate $z$ and permits the water to flow into the trough. Now, when the trough becomes full the float C has risen to such an extent that the pistons P and P¹ of the auxiliary cylinder are now in that position in which both pistons are above the respective openings $s$. The pipe $q$ now communicates with the upper pipe S through the several openings $s$, while the lower openings $a$ are in communication with the exhaust pipe R¹. The water pressure is now transmitted through the pipe S into the cylinder O above the piston V which now descends and shuts off the flow of water. The water below the piston V is forced out from the pipe S¹ through the holes $s^1$ and out through the exhaust pipe R¹. Thus it will be seen that by the alternate rising and lowering of the float the water pressure from the main pipe will be alternately applied to the under and upper side of the main piston V and the water on the other side of the piston will be connected with its respective exhaust pipe. This results in the automatic opening and closing of the main supply pipe to keep the trough filled.

I claim:

1. In a regulating device for water troughs, a casing, a float disposed therein, a pair of upright standards disposed near said casing, an arm secured to one of said standards, a lever pivotally connecting said arm with said float, a cross member secured to the top of said standards, a control valve chamber disposed centrally of said cross member, said cross member constituting the bottom portion of the valve chamber, a piston having pivotal connections at its lower end with said lever and arranged to extend through said cross member into said control valve chamber, upper and lower pistons secured to said piston rod, a main supply pipe for the trough, a valve casing and valve for said pipe, standards secured to the last named valve casing, a cylinder carried by the last named standards, a piston in said cylinder having connections with the valve in the supply pipe, a pipe connecting the lower part of said cylinder with the lower part of said control valve chamber, a pipe connecting the central part of said control valve chamber with the main supply pipe, and exit pipes at the upper and lower ends of said control valve chamber.

2. In a regulating device for water troughs, a casing, a float disposed therein, a pair of upright standards disposed near said casing, an arm secured to one of said standards, a lever pivotally connecting said arm with said float, a cross member secured to the top of said standards having a central opening therethrough and a stuffing box secured in said opening, a control valve chamber disposed centrally of said cross member, said cross member constituting the bottom portion of the valve chamber, the top of the valve chamber consisting of a removable plug, said control valve chamber being provided with annular channels at its upper and lower ends having communication with the interior of the valve chamber by means of a series of small openings, a piston rod having pivotal connections at its lower end with said lever and arranged to extend through said stuffing box, into said control valve chamber, upper and lower pistons secured to said piston rod, a main supply pipe for the trough, a valve casing and valve for said pipe, standards secured to the last named valve casing, a cylinder carried by the last named standards, a piston in said cylinder having connections with the valve in the supply pipe, a pipe connecting the upper portion of said cylinder with the upper part of the control valve chamber, a pipe connecting the lower part of said cylinder with the lower part of said control valve chamber, a pipe connecting the central part of said control valve chamber with the main supply pipe, and exit pipes at the upper and lower ends of said control valve chamber.

WILLIAM L. BRUBAKER.

Witnesses:
L. A. STANLEY,
SOLON C. KEMON.